(12) United States Patent
Li

(10) Patent No.: US 6,580,828 B1
(45) Date of Patent: Jun. 17, 2003

(54) FAST DECODING

(75) Inventor: Wei Li, Cupertino, CA (US)

(73) Assignee: Logitech Europe, S.A., Romanel-sur-Morges (CH)

( * ) Notice: Subject to any disclaimer, the term of this patent is extended or adjusted under 35 U.S.C. 154(b) by 0 days.

(21) Appl. No.: 09/343,934

(22) Filed: Jun. 30, 1999

(51) Int. Cl.[7] ................................................ G06K 9/36
(52) U.S. Cl. ...................... 382/233; 382/246; 708/203; 341/67
(58) Field of Search .............................. 382/233, 232, 382/234, 235, 236, 237, 238, 245, 246; 341/106, 67, 65; 345/501, 502; 708/203; 375/240.02; 358/494

(56) References Cited

U.S. PATENT DOCUMENTS

| | | | |
|---|---|---|---|
| 4,823,201 A | 4/1989 | Simon et al. | 358/133 |
| 5,379,070 A | 1/1995 | Retter et al. | 347/403 |
| 5,572,208 A * | 11/1996 | Wu | 341/67 |
| 5,652,582 A | 7/1997 | Truong et al. | 341/65 |
| 5,686,965 A * | 11/1997 | Auld | 348/423 |
| 5,696,507 A | 12/1997 | Nam | 341/67 |
| 5,872,965 A * | 2/1999 | Petrick | 395/800.16 |

OTHER PUBLICATIONS

Nelson, Mark et al. "The Data Compression Book," M&T Books, Second Edition, Copyright 1993 by Van Nostrand Reinhold, pp. 31–35.

Pennebaker, William B., et al. "JPEG: Still Image Data Compression Standard," Van Nostrand Reinhold, 1996 by M&T Books, pp. 464–467.

Intel Manual, Chapter 1 "Introduction to the Intel Architecture MMX™ Technology," Developer's Manual, Copyright Intel Corporation 1996, pp. 1–1 through 1–4.

* cited by examiner

*Primary Examiner*—Bhavesh M. Mehta
*Assistant Examiner*—Seyed Azarian
(74) *Attorney, Agent, or Firm*—Townsend and Townsend and Crew LLP

(57) ABSTRACT

New and improved variable length decoding methods and apparatus. The present invention provides speed performance and efficiency for decoding data by comparing, in parallel, a first plurality of code words of received data with respective values from a code length table. If the compared first plurality of code words are outside of a criterion, a second plurality of code words of received data are compared with respective values from the code length table. If one of the code words from one of the first and the second compared plurality of code words meets the criterion, it is determined which one of the code words from the first and the second compared plurality of code words has met the criterion. Once the code word meeting the criterion is determined, its symbol value is provided.

10 Claims, 5 Drawing Sheets

FAST DECODING

BACKGROUND OF THE INVENTION

The present invention relates to decoding data and more specifically to decoding data which has been variable length encoded. In particular, the present invention provides new methods and apparatus for decoding Huffman encoded data using a central processing unit (CPU) more quickly and efficiently.

In most computer systems, a number of applications are simultaneously running on the same CPU while data is being compressed/decompressed. As video data is becoming a facet of the computer based communication systems and applications, the need for higher quality images with higher resolution increases. Faster compression/decompression, including encoding/decoding, is needed to lower the amount of delay a user will encounter while dealing with video data.

Huffman coding is one of the algorithms most widely used to compress video data. Huffman coding has been used in various image and video compression standards such as the standards specified by the Joint Photographic Experts Group (JPEG), Motion Picture Experts Group (MPEG), MPEG-II, H.261, H.263, and H.323. These standards are included herein by reference, in there entirety and for all purposes. Huffman coding is a lossless entropy coding technique. Huffman coding utilizes probability to select the shortest code word for the data that occur most frequently. For example, when encoding English text, "E" which is a very popular character in the English language can be represented by a 2-bit code word, whereas "A" which is not used as frequently can be represented by an 8-bit code word.

As a result, Huffman coding compresses data by assigning shorter code words to more frequently occurring data and longer code words to less frequently occurring data. The assigned code words can be maintained in a table which is then used by both recipients and senders. Further details regarding Huffman encoding can be found in "A Method for the Construction of Minimum Redundancy Codes," *Proceedings of the IRE*, Vol. 40, No. 9, September 1952, pp. 1098–1101, by D. A. Huffman, which is incorporated herein by reference in its entirety and for all purposes.

Moreover, Huffman code words are constructed in such a way that no code word is the prefix of another code word. This assures the unambiguous decoding of each symbol from a bitstream of data despite the variable lengths of the codes. Additional description of the characteristics of Huffman codes can be found in Data Compression Book, M&T Books, 1996, by M. Nelson and J. L. Gailly, which is also incorporated herein by reference in its entirety and for all purposes. On pages 31–35, this reference proposes a decoding algorithm based on tree-tracing. This algorithm is, however, not suitable for fast decompression using most of the currently available microprocessors such as Intel® Pentium® family.

Accordingly, a technique is desirable wherein data can be compressed/decompressed and encoded/decoded more quickly and efficiently in a computer system sharing its CPU power.

SUMMARY OF THE INVENTION

The present invention provides improved speed performance and efficiency for decoding data by comparing, in parallel, a first plurality of code words of received data with respective values from a code length table. If the compared first plurality of code words are outside of a criterion, a second plurality of code words of received data are compared with respective values from the code length table. If one of the code words from one of the first and the second compared plurality of code words meets the criterion, it is determined which one of the code words from the first and the second compared plurality of code words has met the criterion. Once the code word meeting the criterion is determined, its symbol value is provided.

In one embodiment, a method is disclosed which further includes masking off the first and the second plurality of code words of the received data. The masking off action defines which portion of the received data is to be compared with the respective values from the code length table. The first plurality of code words may be, for example, 2, 3, 4, and 5 bits from the same starting point of a bitstream. If one of these code words is within a maximum and minimum code value for that length of code, it is presumably the variable length code being searched for and can be applied to the Huffman look-up table. The masking allows the selection of different bit lengths for this parallel comparison.

In another embodiment, an algorithm is disclosed which uses only one table look-up to index the Huffman code value. This minimizes the number of registers required and accelerates the indexing of Huffman code values which can be very valuable in many situations. The algorithm utilizes a table which needs to be calculated only once for each Huffman code table. The algorithm calculates the table values based on results of two other table look-ups.

The present invention is preferably implemented using a microprocessor with an extended multimedia capability. In particular, a microprocessor having built-in capability for performing graphics operations requiring single instruction multiple data (SIMD) operations on multiple pixels is adapted to use the SIMD instructions to perform the decoding operations of the present invention.

For a further understanding of the nature and advantages of the invention, reference should be made to the following description taken in conjunction with the accompanying drawings.

DESCRIPTION OF THE SPECIFIC EMBODIMENTS

Figure 1:
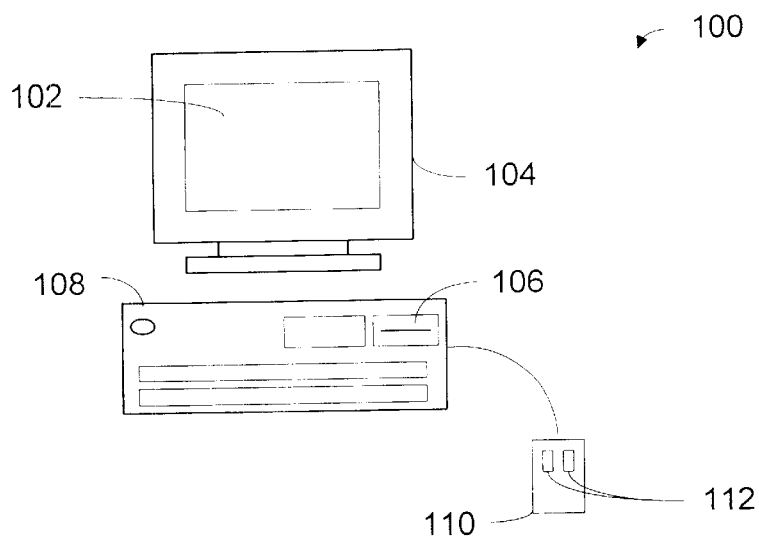
FIG. 1 illustrates an example of a computer system used to execute methods of embodiments of the present invention.

FIG. 1 illustrates an example of a computer system used to execute the software of the present invention. FIG. 1 shows a computer system 100 which includes a monitor 104, screen 102, cabinet 108, keyboard 214 (see FIG. 2), and mouse 110. The mouse 110 can have one or more buttons such as mouse buttons 112. The cabinet 108 can house a CD-ROM drive 106 and a hard drive (not shown) which can be utilized to store and retrieve software programs incorporating the present invention. Although the CD-ROM 106 is shown as removable media, other removable tangible media including floppy disks, tape drives, ZIP® drives, and flash memory can be utilized. The cabinet 108 can also house familiar computer components (not shown) such as a processor, memory, and the like.

Figure 2:
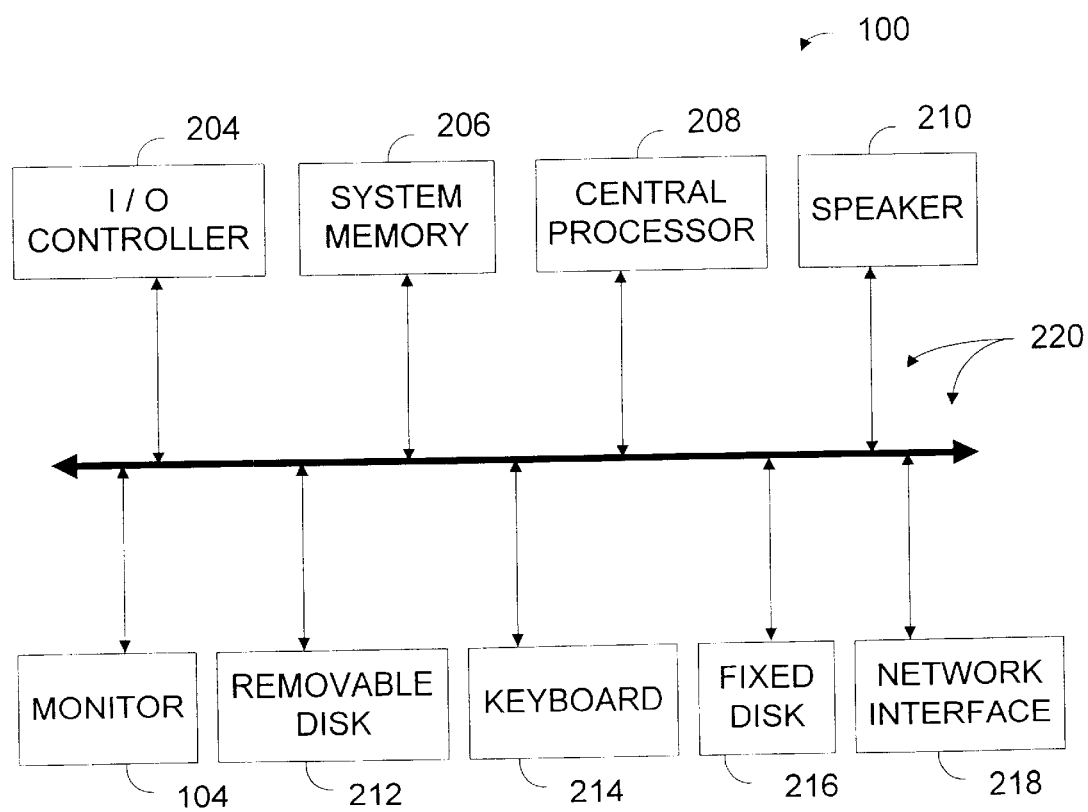
FIG. 2 illustrates a simplified system block diagram of a typical computer system 100 used to execute the methods of embodiments of the present invention.

FIG. 2 illustrates a simplified system block diagram of a typical computer system 100 used to execute the software of embodiments of the present invention. As shown in FIG. 1, the computer system 100 can include the monitor 104. The computer system 100 can further include subsystems such as I/O controller 204, system memory 206, central processor 208, speaker 210, removable disk 212, keyboard 214, fixed disk 216, and network interface 218. Other computer systems suitable for use with the present invention may include additional or fewer subsystems. For example, another computer system could include more than one processor 208 (i.e., a multi-processor system) or a cache memory. Arrows such as 220 represent system bus architecture of the computer system 100. However, these arrows 220 are illustrative of any interconnection scheme serving to link the subsystems.

For example, a local bus could be utilized to connect the central processor 208 to the system memory 206. Also, an image capture device such as a charge-coupled device (CCD) camera can be connected to the computer system 100 for capturing image data. The image capture device can be connected to the computer system 100 via the same or another bus architecture such as a Universal Serial Bus (USB) and the like. USB can provide plug and play support for more than 100 connected peripherals by using an identification number which is matched against a database of device drivers. The USB can also be connected to the computer system 100 through the I/O controller 204 or the network interface 218. Additionally, the computer system 100 can be configured to communicate with the Internet via, for example, the I/O controller 204 or the network interface 218. Accordingly, data can be transmitted to and from the computer system 100 by a variety of devices. The computer system 100 shown in FIG. 2 is but an example of a computer system suitable for use with the present invention. Other configurations of subsystems suitable for use with the present invention will be readily apparent to one of ordinary skill in the art.

The present invention can be embodied in any microprocessor capable of single instruction multiple data (SIMD) execution. For example, the Intel® MMX™ microprocessors, the Sun® UltraSPARC® with Visual Instructions Set, Advance Micro Device, Inc.'s® 3DNow!™, Intel® MMX™ with streaming SIMD extensions, and the like can be utilized. For the sake of example, an implementation using the Intel® MMX™ will be described. The MMX™ technology was formally introduced in January 1997 to accelerate the CPU demanding multimedia applications. The MMX™ technology provides a set of instructions (57 instructions) introduced by Intel® Corporation. It can perform addition, subtraction, multiplication, logic, and arithmetic shifts on a unit of 64 bits in the same instruction. The unit of 64 bits can also be treated as 8 bytes, 4 words, 2 double words, or 1 quad word. Instructions for saturation arithmetic and packing/unpacking data are provided as well as those which transfer data between MMX™ registers and integer registers. Further information regarding MMX™ technology can be found in "Introduction to the Intel® Architecture MMX™ Technology Developer's Manual," Intel® (1996), which is incorporated herein by reference in its entirety and for all purposes.

Figure 3:
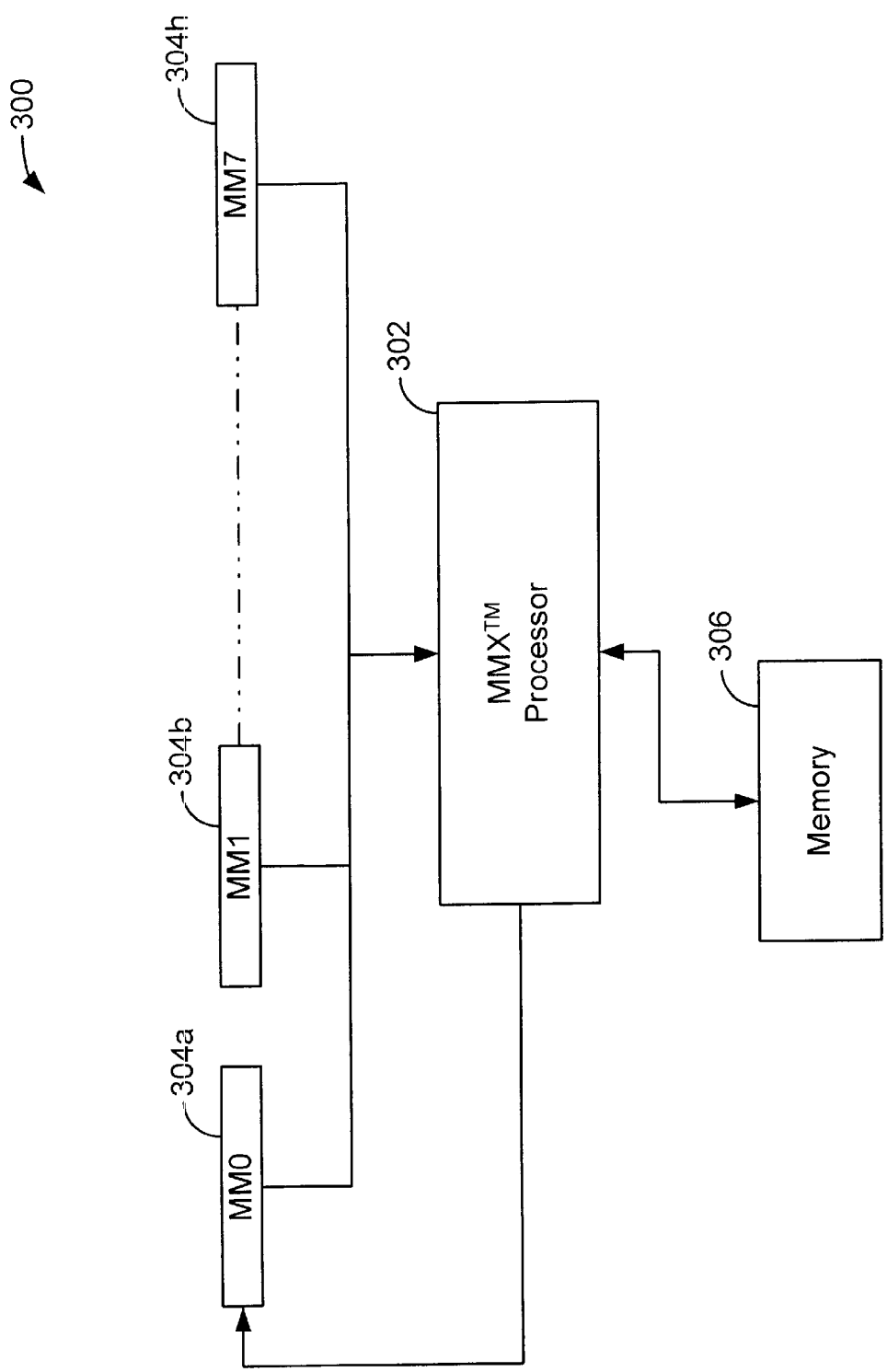
FIG. 3 is a simplified block diagram of a SIMD system 300 in accordance with an embodiment of the present invention.

FIG. 3 is a simplified block diagram of a SIMD system 300. The system 300 includes an MMX™ processor 302 which presently supports a set of 57 instructions. The MMX™ processor can be implemented within a CPU or can be alternatively implemented in a separate chip. The MMX™ processor 302 receives data from registers 304a–h. Each of the registers 304a–h are 64 bits wide. Each of these registers can hold 8×8, 16×4, 32×2, 64×1 bits of data. The MMX™ processor 302 receives the data from the registers 304a–h and performs the required operations on the data in one cycle. The processed data is then either provided to a memory 306 or back to registers 304a–h. The memory 306 can be implemented within the MMX™ processor 302 or it can alternatively be shared memory. As a result, the MMX™ processor 302 can perform the same operations on different data at the same time, hence it has an SIMD architecture.

Figure 4:
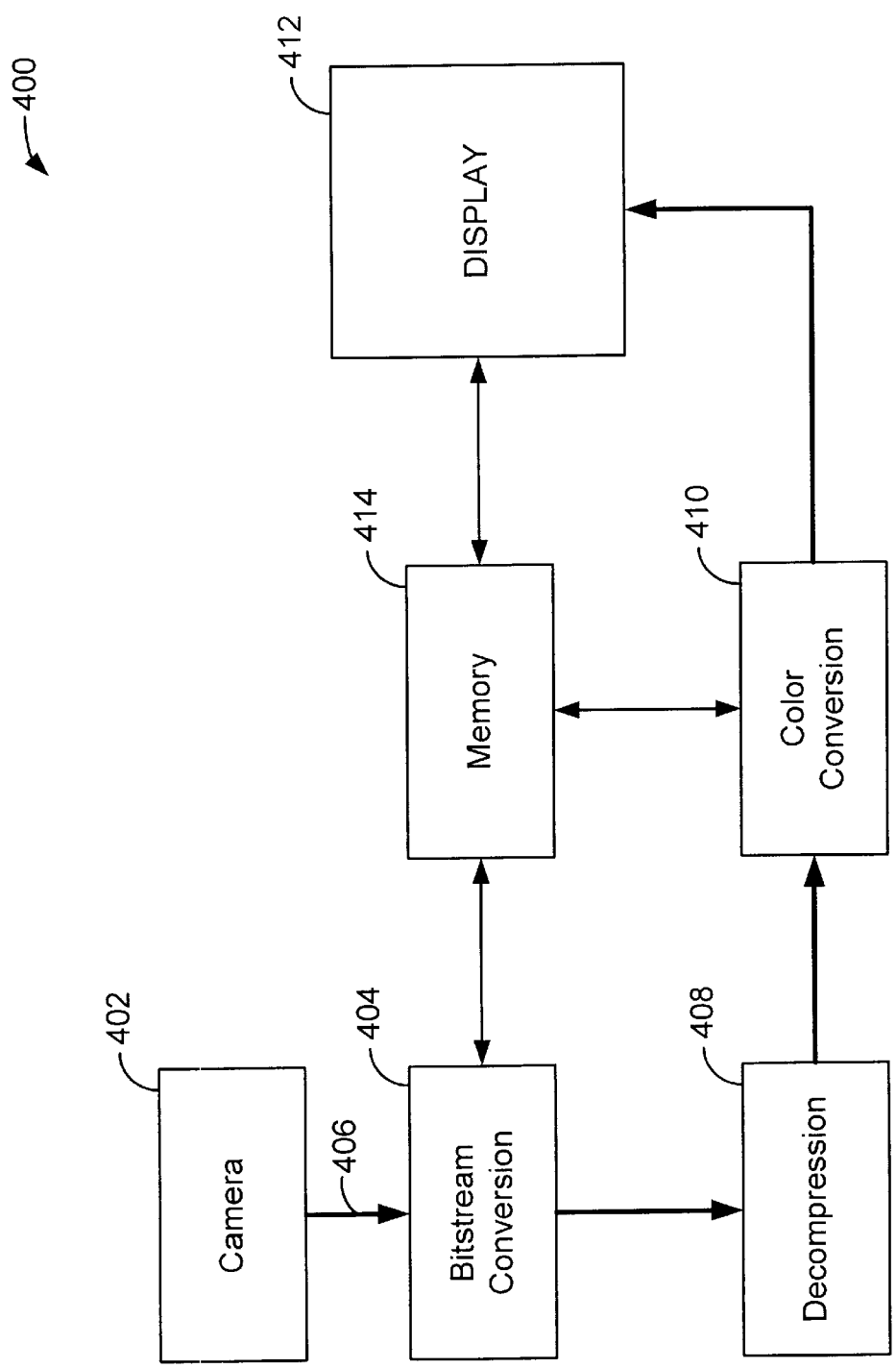
FIG. 4 illustrates a simplified block diagram of a system 400 in accordance with an embodiment of the present invention.

FIG. 4 illustrates a simplified block diagram of a system 400 in accordance with an embodiment of the present invention. A camera 402 captures images and provides them to a bitstream conversion block 404. The camera 402 can include circuitry for conversion of analog data to digital data. The camera 402 can also include circuitry to perform data compression and/or encoding. The camera 402 and the bitstream conversion block 404 are connected via connector 406. The connector 406 can be selected from a number of connectors or bus architectures which are well known to those with ordinary skill in the art. The connector 406 is preferably a USB connection. In some implementations, USB provides a 12 Mb/sec bandwidth. Another choice for connector 406 can be Firewire (IEEE 1394) which can provide a bandwidth of 100 Mb/sec, 200, 400, or 800 Mb/sec. A USB connection is preferred for some embodiments because it is a powered bus which currently provides up to 500 mA and 5 V. The power provided by USB can be utilized to run the devices connected to the bus, such as the camera 402. Additionally, USB is less costly to implement. In some embodiments, since USB does not have the same bandwidth as Firewire, USB can be utilized where the data is first compressed prior to transmission on the USB.

Accordingly, the camera 402 can include compression circuitry to compress the captured images before sending the data to the bitstream conversion block 404. The camera 402 can be any number of devices for capturing images including a CCD, complementary metal oxide semiconductor (CMOS), and the like. The bitstream conversion block 404 can be configured to convert serially transmitted data into packets of data. For example, the bitstream conversion block 404 can accumulate data for each image frame and send the accumulated data to a decompression block 408. The frame of data can be any size, but is preferably 352×288 pixels. The frame can also be a block of 320×240, 176×144, or 160×120 pixels. In some embodiments, the frame of data can be a block of 640×480 pixels. The decompression block 408 decompresses and/or decodes the data received from the bitstream conversion block 404. The decoding can be in accordance with Huffman coding, arithmetic coding, other types of entropy coding, and the like. The bitstream conversion block 404 can also include buffers for storage of the data received from the camera 402 and the data sent to the decompression block 408.

The decompressed data from the decompression block 408 is then provided to a color conversion block 410. The data from the decompression block 408 can be in any format but is preferably in YUV format, where Y is luminance, U is chrominance red (also known as CR), and V is chrominance blue (also known as CB). The conversion block 410 converts the YUV format data to a format suitable for a display 412, including RBG (red, green, and blue). The display 412 can be any output device including a printer, a handheld device, and the like. The system 400 also includes a memory 414 which can provide storage for the display 412, the color conversion block 410, and the bitstream conversion block 404. The memory 414 can be any type of storage such as dynamic random access memory (DRAM), extended output DRAM (EDO DRAM), synchronous DRAM (SDRAM), video ram (VRAM), static ram (SRAM), and the like. Alternatively, the bitstream conversion block 404, the color conversion block 410, and the display 412 can have their own local memory. Also, the decompression block 408 can have its own storage or use the memory 414 for its storage when needed.

Figure 5:
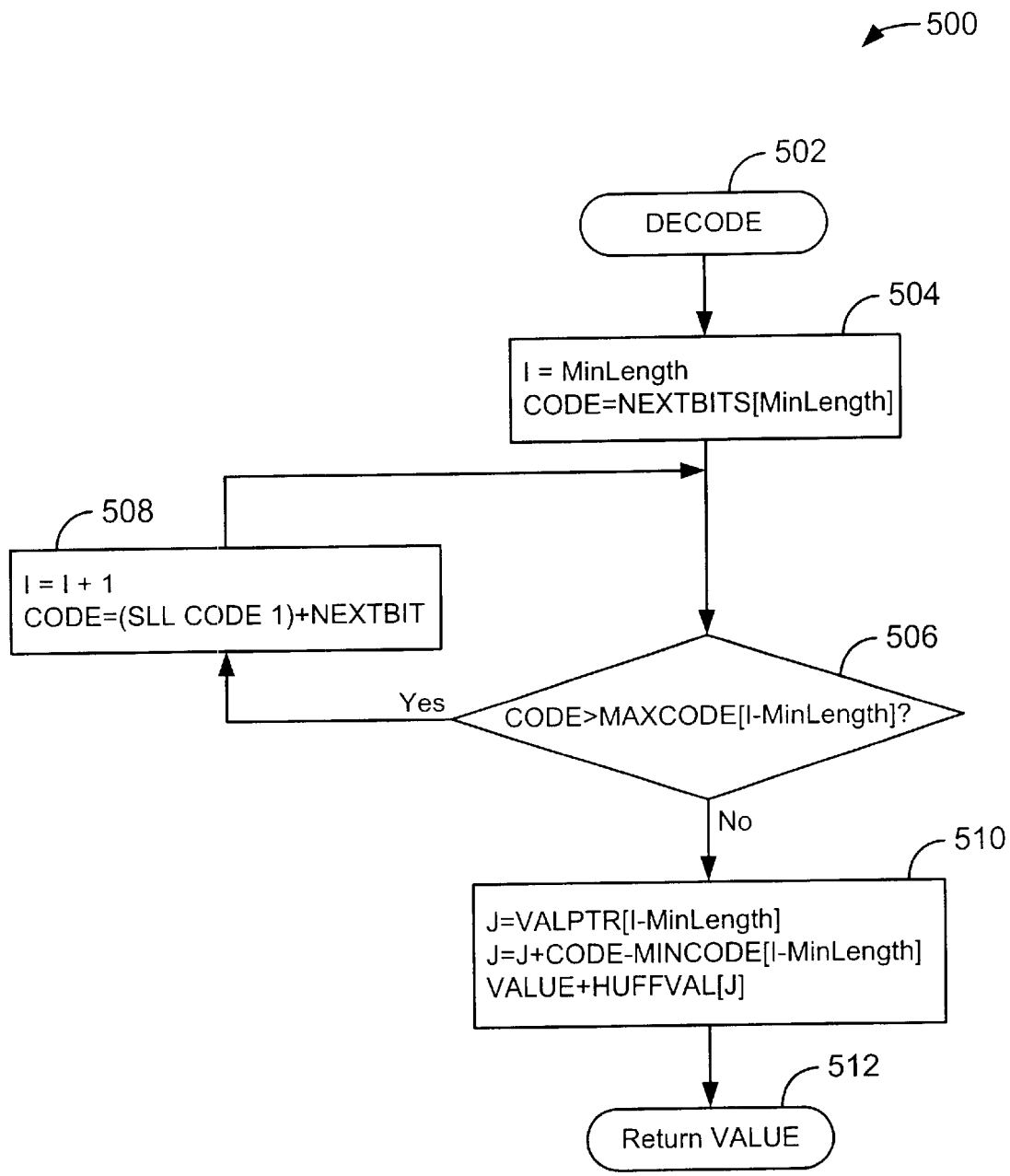
FIG. 5 illustrates a sequential decoding method 500 for decoding Huffman encoded data in accordance with an embodiment of the present invention.

FIG. 5 illustrates a sequential decoding method 500 for decoding Huffman encoded data in accordance with an embodiment of the present invention. The sequential decoding method 500 uses the following four tables to produce the decoded value:

MINCODE[I]—minimum value of code words with length I;

MAXCODE[I]—maximum value of code words with length I;

HUFFVAL[J]—table of symbol values corresponding to the $J^{th}$ code word; and

VALPTR[I]—the index to the start of the list of values in HUFFVAL which are decoded by code words of length I.

The minimum length of all code words is MinLength and the maximum length of all code words is MaxLength. Hence, the size of tables MINCODE, MAXCODE, and VALPTR is equal to [MaxLength-MinLength+1]. The size of HUFFVAL depends on the number of code words, and is denoted as N. The three tables MINCODE, MAXCODE, and VALPTR are used to decode a pointer to the HUFFVAL table for each valid Huffman code.

In a step 502, bitstream data is received for decoding. In a step 504, a current code length I is set to MinLength. Step 504 also initializes a variable CODE to NEXTBITS [MinLength] which contains the code words from the bitstream provided by the step 502. A step 506 compares the value of CODE to MAXCODE[I]. If the value of CODE is greater than the value of MAXCODE[I], it is indicated that the current code word has a length larger than I, which was first initialized to MinLength in step 504, and the step 506 is followed by a step 508. In the step 508, the value of I is incremented by one. The step 508 also reads the next bit of the bitstream into CODE. The step 508 updates the value of CODE by performing a shift logic left (SLL) on current value of CODE by one bit, and filling the least significant bit of CODE with the next bit from the bitstream (NEXTBIT).

On the other hand, if in the step 506, it is determined that the value of CODE is not greater than the value of MAXCODE[I], it is indicated that the current code word has a length equal to or less than I, and the step 506 is followed by a step 510. The step 510 decodes the symbol value. The step 510 computes a code value pointer J and then uses J to compute the symbol value. The step 510 sets J to {VALPTR [I-MinLength]+CODE-MINCODE[I-MinLength]}. The step 510 then computes the symbol value by setting VALUE to HUFFVAL[J]. Accordingly, the step 510 performs three table look-ups, including VALPTR, MINCODE, and HUFFVAL, to compute the symbol value. The calculated symbol value (VALUE) is then provided to a step 512 to be output. The sequential decoding method 500 is repeated for the next code word.

The Huffman table used for encoding and decoding can be customized for each implementation. But, most coding standards provide a default Huffman table. Table 1 below illustrates a recommended Huffman table for luminance DC difference in accordance with the JPEG standard. Further information regarding the JPEG standard can be found in "JPEG—Still Image Data Compression Standard," Appendix A. ISO DIS 10918-1, Requirements and Guidelines, pp. F-26, Van Nostrand Reinhold, 1993, by William B. Pennebaker and Joan L. Mitchell, which is incorporated herein by reference, in its entirety and all purposes.

In the JPEG standard, MinLength is 2 and MaxLength is 16. Code words are further sorted to be grouped in length and in ascending value order in each length group. The values in MINCODE and MAXCODE are signed 16 bit integers.

TABLE 1

| HuffValue | CodeLength | CodeWord | HuffCode |
|---|---|---|---|
| 0 | 2 | 00 | 0 |
| 1 | 3 | 010 | 2 |
| 2 | 3 | 011 | 3 |
| 3 | 3 | 100 | 4 |
| 4 | 3 | 101 | 5 |
| 5 | 3 | 110 | 6 |
| 6 | 4 | 1110 | 14 |
| 7 | 5 | 11110 | 30 |
| 8 | 6 | 111110 | 62 |
| 9 | 7 | 1111110 | 126 |
| 10 | 8 | 11111110 | 254 |
| 11 | 9 | 111111110 | 510 |

In Table 1, CodeWord represents the actual code words from the bitstream; CodeLength is the length of each code word; HuffCode is the value of each CodeWord; and HuffValue is the Huffman code for each symbol.

Taking the values from Table 1 as an example, with MinLength=2 and MaxLength=9, the table values of the three tables utilized by the sequential decoding method 500 are as follows:

MINCODE[8]={0, 2, 14, 30, 62, 126, 254, 510};
MAXCODE[8]={0, 6, 14, 30, 62, 126, 254, 510}; and
VALPTR[8]={0, 1, 6, 7, 8, 9, 10, 11}.

For example, considering an incoming bitstream "010," the step 504 will set I to 2 and CODE to "01." The step 506 will return YES because "01" is greater than MAXCODE [2-2] which is 0. In the step 508, I is incremented to 3 and CODE is set to "010." The step 506 is repeated again and this time it will return NO because "010" is less than MAXCODE[3-2] which is 6. Then, the step 510 will set J equal to 1. The step 510 also looks up the symbol value for HUFFVAL[1] and outputs this symbol value (VALUE) in the step 512.

Accordingly, the sequential method 500 repeatedly shifts the bitstream into CODE and compares the current code with the maximum code of the same length. Once code length is known, the decoding of each value needs two additions and three table look-ups. This algorithm is sequential in nature because code lengths are checked sequentially. That is, before checking length 1, there is no indication of whether the actual code length will be I, I+1, I+2, etc.

Figure 6:
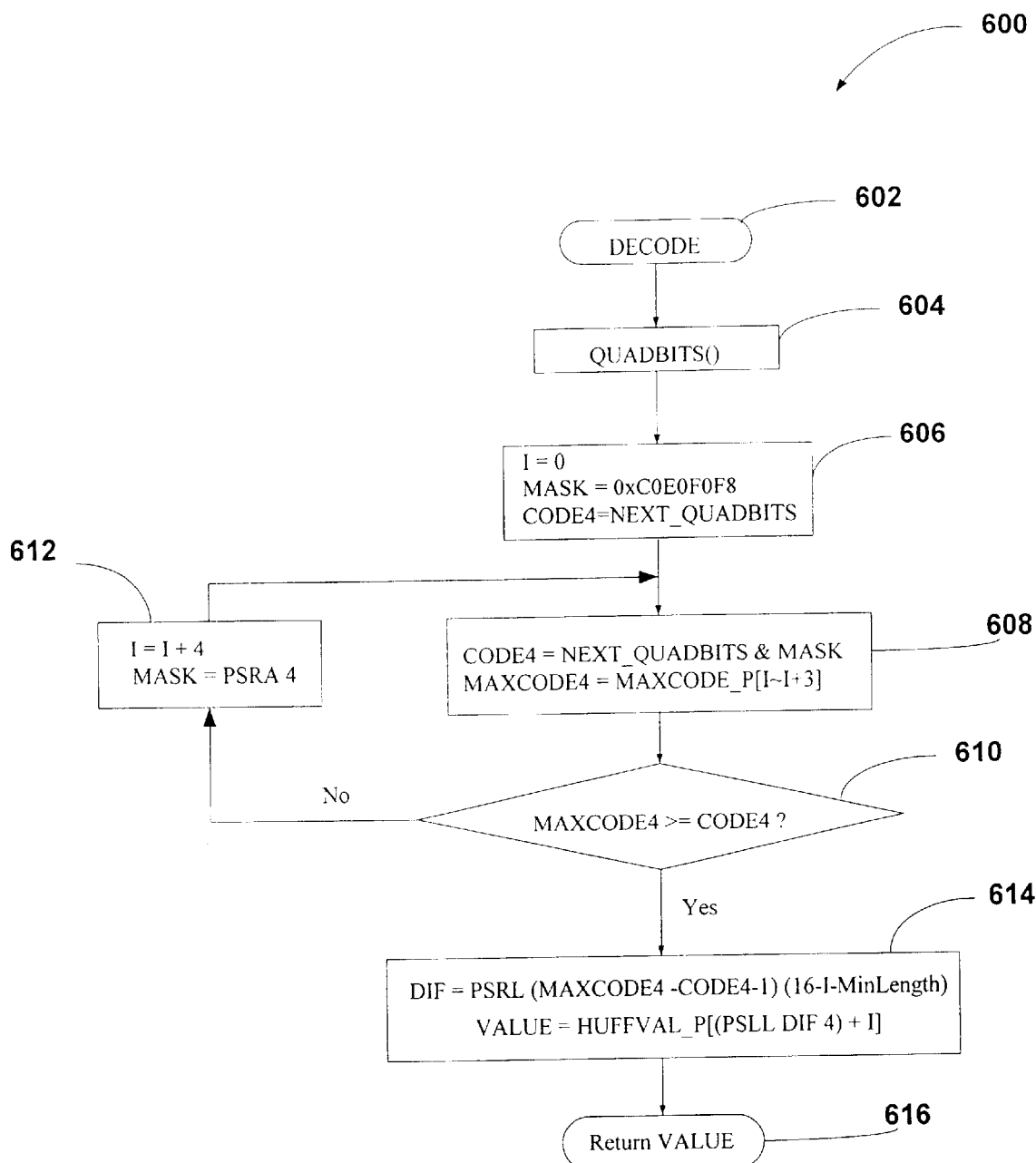
FIG. 6 illustrates a parallel decoding method 600 for decoding Huffman encoded data in accordance with another embodiment of the present invention.

FIG. 6 illustrates a parallel decoding method 600 for decoding Huffman encoded data in accordance with another embodiment of the present invention. For the sake of example, an implementation of the parallel decoding method 600, such as discussed with respect to FIG. 3, will be described. Also, sample JPEG values discussed with respect to FIG. 5 and Table 1 are utilized in the sample embodiment. The parallel decoding method 600 can, however, be performed on any processor capable of SIMD executions including Intel® MMX™ microprocessors, the Sun® UltraSPARC® with Visual Instructions Set, Advance Micro Device, Inc.'s® 3DNow!™, Intel® MMX™ with streaming SIMD extensions, and the like.

As detailed above, MMX™ technology can perform operations on a unit of 64 bits in the same instruction. The unit of 64 bits can also be treated as 8 bytes, 4 words, 2 double words, or 1 quad word. For the example in accordance with values from Table 1, the 64 bits can be treated as four 16-bit registers (or 4 words) because the maximum code word length in Table 1 is 9. For the example embodiment of FIG. 6, the MMX™ instructions PSRL, PSLL, and PSRA are utilized to shift the contents of selected variables. PSRL denotes pack shift right logic. PSLL denotes packed shift left logical and PSRA denotes packed shift right arithmetic.

The parallel decoding method 600 receives the bitstream in a step 602. In a step 604, the bitstream is arranged in 4-bit portions (or quadbits) with little-endian format. This means if the original bitstream is of the form b0,b1,b2,b3, . . . (where bi stands for byte i), then the converted bitstream will be of form: b1,b0,b1,b0,b1,b0,b1,b0 ,b3,b2,b3,b2,b3,b2,b3, b2,b3,b2, . . .

This conversion can be implemented using 5.5 cycles for each 16-bit word. In a step 606, values of I, MASK, and CODE4 are initialized. As discussed above for the JPEG example, I is initialized to 2. The step 606 initializes CODE4 to the first set of 4×16-bit codes (or quadbits) from the bitstream. The parallel decoding method 600 uses MASK to mask out the bits for a comparison operation in a step 608. The initial value for MASK is set to "1100,0000,0000,0000, 1110,0000,0000,0000,1111,0000,0000,0000,1111, 1000, 0000,0000 b" or "0xC000,E000,F000,F800." This is the bit mask for code lengths 2 through 5 which will be checked in the first iteration of the parallel decoding method 600.

In a step 608, CODE4 is masked off by the value of MASK. The step 608 also sets MAXCODE4 to MAXCODE4_P[I~I+3] which represents values of MAXCODE4_P for I, I+1, I+2, and I+3. Accordingly, MAXCODE4 will hold the maximum values for the four successive code lengths. Because the four values for MAX-CODE4 will be loaded in one single instruction, the MAX-CODE table for the parallel decoding method 600 can be generated as follows:

---

$I = 0$
while $I$ is less than (*MaxLength-MinLength* + 2) do
    $J = (I/4)*4 + 3 - I\%4$
    *MAXCODE_P*[$I$] = $(2^{(16-MinLength-J)}*MAXCODE[J]) + 1$
    $I = I + 1$
end while

--- where "/" denotes division by truncation and "%" denotes modulo operation. The values of MAXCODE_P are unsigned 16-bit integers. The MAXCODE table only has to be generated once for each Huffman table.

Taking the same example as in the sequential Huffman decoding algorithm discussed with respect to FIG. 5, the MAXCODE table for the parallel algorithm will have the following values:

MAXCODE_P[8]={61441, 57345, 49153, 1, 65281, 65025, 64513, 63489}

For this example, the dimension of this table must be a multiple of 4. Also, zero is assumed for those code lengths that do not exist in the Huffman code table.

In a step 610, the value of MAXCODE4 is compared with CODE4 which was initialized and masked in the steps 606 and 608. In the embodiments which use the MMX™ technology, since the MMX™ instruction PCMPEQ compares only signed words, this comparison operation can be performed by one unsigned substraction with saturation and one comparison with zero. The values of MAXCODE+1 can be stored in MAXCODE4. If CODE4 is found to be greater than MAXCODE4, then in a step 612, I is incremented by 4 and the MASK is updated by shifting its value right arithmetically by 4 bits. The new value of MASK will create the bit mask for the next remaining 4 code word lengths (6 through 9). After the step 612, the steps 608 and 610 are repeated. Accordingly, for the example of Table 1, the steps 608 and 610 are repeated twice, once for code word lengths 2 through 5 and once for code word lengths 6 through 9.

Once the step 610 returns a YES, a step 614 determines which one of the four lengths being checked contains the symbol. Accordingly, the step 614 computes a value of DIF which is set to [MAXCODE4-CODE4-1] shifted logically right by 4 bits. The step 610 also performs a table look-up to provide the found symbol value (VALUE). The step 614 looks up the symbol value (VALUE) in a table HUFFVAL_P.

For this example, assuming 1<I<17, a HUFFVAL_P table can be created using [I+16*(MAXCODE[I]-CODE)] as index. Let:

M=max(MAXCODE[I]-MINCODE[I]); and
I=0,1,2, . . . , MaxLength-MinLength.

The HUFFVAL_P table will have a size of[16*(M+2)]. Let COENUM[I] denote the number of code words whose code length is (I+MinLength). Let CODE[J] denotes the code value of the $J^{th}$ code with code length I. The entries of the large HUFFVAL table can be computed as follows:

---

$I = 0$
while *I* is less than (*MaxLength–MinLength* + 1) do
    $J = 0$
    while *J* is less than *CODENUM*[*I*] do
        *HUFFVAL_P*[*I*+16*(*MAXCODE*[*J*]+1-*CODE*[*J*])] =
            *HUFFVAL*[*VALPTR*[*I*]+*CODE*[*J*]-*MINCODE*[*I*]]
        $J = J + 1$
    end while
    $I = I + 1$
end while

---

Accordingly, values in the HUFFVAL_P table will be the maximum size of unsigned 16-bit integers depending on the number of the Huffman codes. By combining the three table look-ups of the sequential method into one, the instructions needed to index a Huffman code value is significantly reduced. At the same time, reducing the number of table look-ups saves valuable register space. Also, note that (MAXCODE[I]+1-CODE) was computed when determining the code length and is available for this table look-up.

In a step 616, the calculated symbol value (VALUE) is output. Once the code length of current Huffman code is determined in the step 614, the current 4×16-bit code word can be left shifted and the same number of bits from the next 4×16-bit code word can be shifted in. The decoding of next Huffman code can then be started.

Accordingly, the parallel decoding method 600 reads in 4 bits of data at a time from the bitstream. Each consecutive 4-bit lengths are checked in parallel to see if the current code word falls in that range. Instead of the required 16 checks to cover the range 1 through 16 in the sequential algorithm, only 4 checks are needed to cover the same range. Another significant improvement is to combine the three table look-ups for decoding into one single table look-up. This has the effect of minimizing computations as well as register usage, which can be very valuable in many situations.

SAMPLE EMBODIMENT FOR LENGTHS 1 THROUGH 8

The example embodiment discussed above assumes that the code words have lengths between 2 and 9. If, however, the code words have lengths between 1 and 8, the decoding can be done on units of 8 bits. A maximum of one check instead of 8 is needed for each code word. This requires that the bitstream be expanded into 8×8 bits. For example, if the input bitstream is "b0,b1, . . . " (where bi stands for byte i), the converted bitstream will be "b0,b0,b0,b0,b0,b0,b0,b0, b1,b1,b1,b1,b1,b1,b1,b1, . . . " The initial bit mask will now be "10000000,11000000,11100000, 11110000,11111000, 11111100,11111110,11111111 b" or "0x80C0,E0F8,F8FC, FEFF."

The table entries will be generated as follows:

```
I = 0
while I is less than (MaxLength-MinLength + 1) do
    J = (I/8)*8 + 7 - I%8
    MAXCODE_P[I] = (2^(8-MinLength-I)*MAXCODE[J]) + 1
    I = I + 1
end while
I = 1
while I is less than 9 do
    J = 0
    while J is less than CODENUM[I] do
        HUFFVAL_P[I+8*(MAXCODE[I]+1-CODE[J])] =
            HUFFVAL[VALPTR[I]+CODE[J]-MINCODE[I]]
        J = J + 1
    end while
    I = I + 1
end while
```

The values for HUFFVAL_P table will be unsigned 8-bit integers. The values for MAXCODE_P table will be unsigned 8-bit integers.

SAMPLE EMBODIMENT FOR LENGTHS 1 THROUGH 32

If the length of code words are between 1 and 32, the decoding can be done on units of 32 bits. A maximum of 8 checks instead of 16 checks will be needed to determine the length of a code word. The bitstream will be extended into 2×32 bit form as follows:

Input bitstream: b0,b1,b2,b3,b4,b5,b6,b7, . . .

Output bitstream: b3,b2,b1,b0,b3,b2,b1,b0,b7,b6,b5,b4, b7,b6,b5,b4, . . .

The initial bit mask will now be "10000000,00000000, 00000000, 00000000,11000000,00000000,00000000, 00000000,00000000 b" or "0x8000,0000, C000,0000."

The table entries will also be computed as follows:

```
I=0
while I is less than 32 do
    J = (I/2)*2 + 1 - I%2
    MAXCODE_P[I] = (2^(32-MinLength-I)*MAXCODE[J]) + 1
    I = I + 1
end while
I = 1
while I is less than 32 do
    J = 0
    while J is less than CODENUM[I] do
        HUFFVAL_P[I+32*(MAXCODE[I]+1-CODE[J])] =
            HUFFVAL[VALPTR[I]+CODE[J]-MINCODE[I]]
        J = J + 1
    end while
    I = I + 1
end while
```

Thus, the values for MAXCODE_P table will be unsigned 32-bit integers. Values of table HUFFVAL_P will be the maximum size of unsigned 32-bit integers.

PERFORMANCE EVALUATION

The proposed parallel Huffman decoding algorithm has been implemented in MMX™ assembly code. For this section, the CPU time to expand the original bitstream into 4×16-bit portions is included in the decoding time.

If code words of length I appear with a probability of $2^{-I}$, then the probability that a code word is of length I will be $CODENUM[I]*2^{-I}$. Letting T[I] be the time to decode a code word of length I, then the average decoding time for one symbol can be calculated as follows:

$$\overline{T} = \sum_{I=2}^{16} \frac{CODENUM[I]*T[I]}{2^I}$$

Assuming the compression of ten common intermediate format (CIF) pictures using a sequential algorithm and where only one-fourth of the discrete cosine transform (DCT) coefficients are coded using the RUN-LEVEL symbols, the number of Huffman code words to be decoded can be calculated as follows:

(352*288/4)*10=253,440

Even though DCT is selected for this example, it would be obvious to those with ordinary skill in the art to utilize any transforms such as differential parse code modulation (DPCM), wavelet, sub-band transform, vector quantization, and the like. Using a 166 MHz Intel® Pentium® processor with MMX™, the decompression timing for the best case (where all code words are 2 through 5 bits long), worst case (where all code words are 12 through 15 bits long), and average case (where code lengths are distributed between 2 through 16 bits) are shown in Table 2 below.

TABLE 2

| Decoding Time (in msec) | Parallel Huffman Decoding |
|---|---|
| best case | 111 |
| average case | 113 |
| worst case | 218 |

Table 2 demonstrates that the parallel algorithm significantly reduces the worst case timing while giving superior performance for the average case. Also, note that even better results may be achieved by optimizing the assembly code further.

As will be understood by those with ordinary skill in the art, the present invention may be embodied in other specific forms without departing from the spirit or essential characteristics thereof. For example, the techniques of the present invention can also be applied to other SIMD systems such as the Sun® UltraSPARC® with Visual Instructions Set, Advance Micro Device, Inc.'s® 3DNow!™, and the like can be utilized.

Also, Intel®'s new Pentium® III (also know as Katmai), the successor of Pentium® II adds streaming SIMD extensions. Pentium® III provides 70 new instructions. Many instructions are for floating point SIMD operations which are targeted at 3-D applications. Several instructions for fixed point number operations have also been added. These instructions are, in part, targeted at the MPEG encoding/decoding (motion estimation, motion compensation). Those with ordinary skill in the art would, however, understand that these new instructions can be taken advantage of to further accelerate the decoding techniques of the present invention. For example, Min and Max operations can speed up the code length detection. Insertion instruction to transfer integer registers and part of MMX™ registers also provides speed-up. Similarly, broadcast instruction can duplicate the bitstream in a more efficient manner.

Alternately, the techniques of the present invention can be implemented in a computer system. For example, the methods 500 and 600 can be implemented on a peripheral component interconnect (PCI) card. The PCI card can be installed onto the PCI bus of a personal computer. Also, other bus technologies such as NUBUS, ISA, EISA, Universal Serial Bus (USB), 1394 Firewire, and Accelerated Graphics Port (AGP) can also be utilized. Moreover, the techniques of the present invention can be implemented by utilizing the available routines and features such as caching, new instruction sets, multi processor systems, and their equivalents. Accordingly, for an understanding of the scope of the invention, reference should be made to the appended claims.

What is claimed is:

1. A method of decoding data comprising:
   receiving the data to be decoded, the received data having been variable length encoded;
   computing a code length table, the code length table including values for maximum length of code words for an encoding technique utilized to variable length encode the received data;
   masking off a first plurality of code words of the received data;
   comparing, in parallel, the masked off first plurality of code words with respective values from the code length table;
   if the compared first plurality of code words are greater than the respective values from the code length table, comparing a second plurality of code words of received data with respective values from the code length table;
   masking off the second plurality of code words of the received data, the masking off of the second plurality of code words defining which portion of the received data is to be compared with the respective values from the code length table;
   if one of the code words from one of the first and the second compared plurality of code words is less than or equal to the respective value from the code length table, determining which one of the code words from the first and the second compared plurality of code words meets the criterion; and
   providing a symbol value for the determined code word.

2. A system for transferring an image from a camera, the system comprising:
   an encoder coupled to the camera, the encoder configured to encode the image received from the camera by applying variable length encoding to the image;
   a bitstream converter coupled with the encoder and configured to convert serially transmitted data into packets of data, the transmitted data including data forming the image;
   a connector coupling the encoder and the bitstream converter;
   a decoder coupled to the bitstream converter, the decoder configured to decode the encoded image, the decoder including code comprising instructions for:
   receiving the data to be decoded;
   comparing, in parallel, a first plurality of code words of the received data with respective values from a code length table;
   if the compared first plurality of code words are outside a criterion, comparing a second plurality of code words of received data with respective values from the code length table;
   if one of the code words from one of the first and the second compared plurality of code words meets the criterion, determining which one of the code words from the first and the second compared plurality of code words meets the criterion; and
   providing a symbol value for the determined code word; and
   an output device coupled to the decoder, the output device configured to output the decoded image, the decoded image being formed by provided symbol values from the decoder.

3. The system of claim 2 wherein the connector is selected from a group comprising PCI, NUBUS, ISA, EISA, USB, Firewire, and AGP.

4. The system of claim 2 wherein the decoder includes a CPU, the CPU being capable of SIMD operations.

5. The system of claim 2 wherein the decoder includes a CPU selected from a group comprising Intel® MMX™, Sun® UltraSPARC® with Visual Instructions Set, Advance Micro Device, Inc.'s® 3DNow!™, and Intel® MMX™ with streaming SIMD extensions.

6. The system of claim 2 wherein the variable length encoded image is formatted using a technique selected from a group comprising Huffman coding and arithmetic coding.

7. The system of claim 2 wherein the first and the second plurality of code words are selected from a consecutive group of received data.

8. The system of claim 2 wherein the first and the second plurality of code words of received data are distinct from each other.

9. The system of claim 2 wherein the first and second plurality of code words each include overlapping code words from the received data.

10. The system of claim 2 wherein the criterion is that the first and the second plurality of code words are less than or equal to the respective values from the code length table.

* * * * *